April 23, 1940.  J. E. PAUL ET AL  2,198,443
LIGHT INDICATOR
Filed June 21, 1938
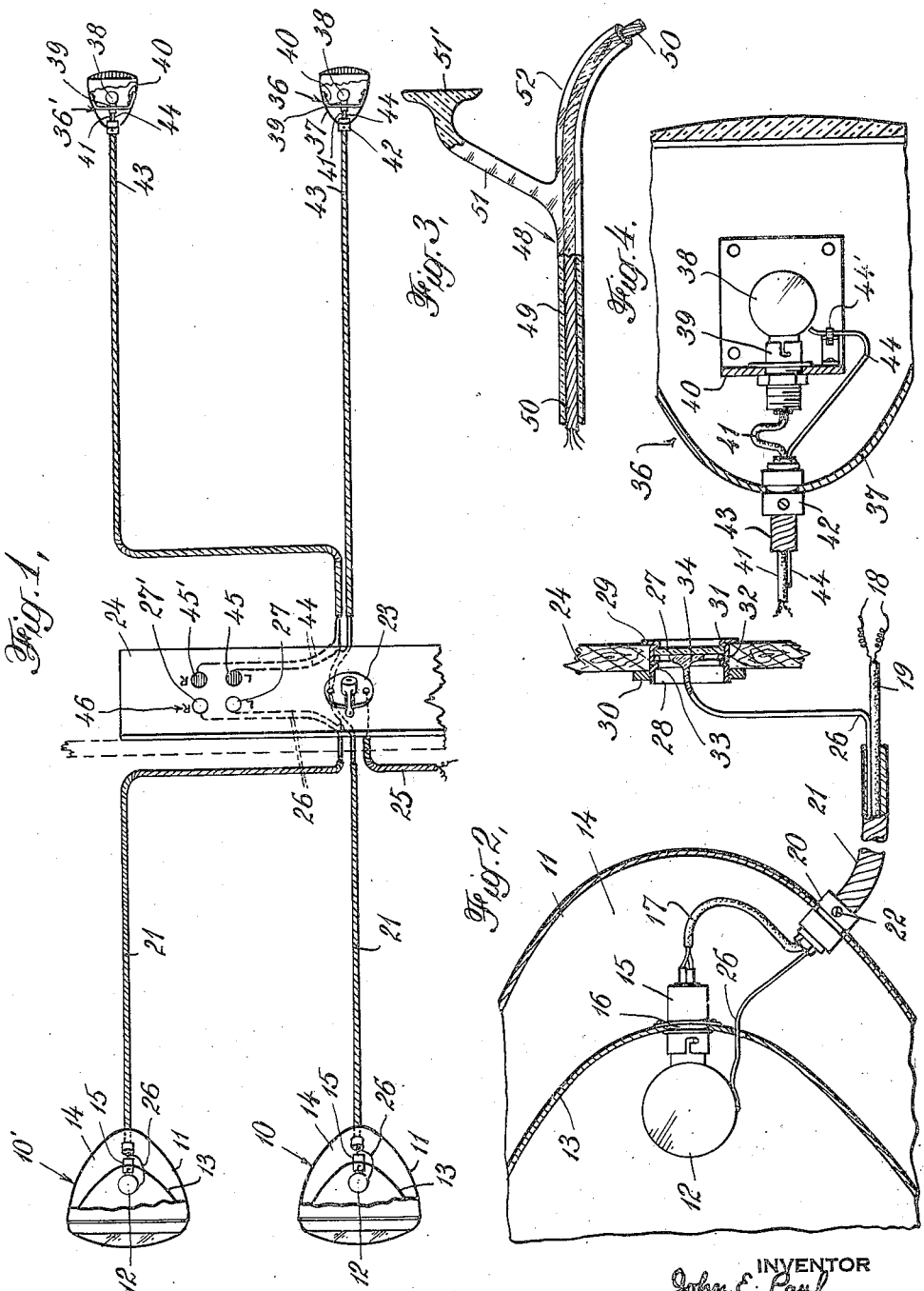
INVENTOR
John E. Paul
Clarence B. Lee
BY
Pennie Davis Marvin & Edmonds
ATTORNEYS Patented Apr. 23, 1940

2,198,443

UNITED STATES PATENT OFFICE 2,198,443

LIGHT INDICATOR

John E. Paul, Newark, and Clarence B. Lee, Morristown, N. J.

Application June 21, 1938, Serial No. 214,976

5 Claims. (Cl. 240—8.41)

This invention relates to lighting devices and has particular reference to a novel device of this character which comprises means located at a point remote from the light source for indicating when the light source is functioning. The new device is simple in construction and reliable in operation and may be manufactured and operated at low cost.

Lighting devices have been devised heretofore having indicating means by which an operator may determine at a distant point whether or not the light source is functioning, but prior devices of this type are unsatisfactory for various reasons. One form of these devices, previously employed on vehicles, comprises an indicating lamp located on or near a control panel and included in the circuit of the lighting switch of the vehicle, so that the lamp is energized when the operator turns on the switch. While the indicating lamp shows when the switch is turned on, it does not indicate whether each of the lamps in the circuit is emitting light. That is, since the head and tail lights are connected in parallel, any one of them may burn out without breaking the circuit through the light switch and the indicating lamp. Also, the indicating lamp requires an appreciable amount of current for its operation and burns out occasionally, thereby rendering the indicating means inoperative.

Another lighting system devised heretofore includes a light transmitting rod mounted on each headlight of a vehicle with one end exposed to the light rays emitted from the headlight, the rod being bent into an L-shape or a U-shape so that the opposite end is in view of the driver. When the headlight is functioning, the light emitted from it is transmitted by the rod to the rear end thereof, where it provides a glow visible to the driver. Devices of this type, however, are not suited for indicating whether the tail lights of the vehicle are functioning, since the devices when connected to the tail lights would be invisible to the driver. In addition, the light transmitting rods, being exposed, may be easily damaged and are liable to become coated with dirt so that the indicating light is invisible.

The present invention, therefore, is directed to the provision of a novel lighting device having indicating means which overcomes the objections inherent in prior light indicators and which, in addition, is adapted for manufacture and installation at low cost.

A lighting device made in accordance with the present invention comprises a light source, such as an incandescent lamp, and a flexible, wire-like piece of light-transmitting material having one end disposed in position to receive rays from the light source, and the other end located at a remote point, preferably in back of a control panel. The light-transmitting material is preferably an organic plastic, such as a methacrylate resin, whereby the end of the wire remote from the light source may be molded into a lens which is visible to the operator or may be cemented or otherwise connected to a glass lens. When the lighting device is to be used on vehicles and the like, we prefer to provide a separate light-transmitting wire for each light on the vehicle and pass the wire through the same cable or sheathing which houses the electric wires leading to the light. The light-transmitting wire may be passed through the cable from the head or tail light to the control panel, which may be provided with a switch for the lights and with suitable indicia for indicating the light corresponding to each of the light-transmitting wires. If desired, the light-transmitting material may be molded around the electric wires, in which case it serves not only as a light-transmitting medium, but also as a suitable electric and heat insulator for the wires.

It will be apparent that the indicating means of the new lighting device does not require electrical energy for its operation and has no moving elements or parts which require replacement. The light-transmitting wires are adequately protected by the cable for the electric wires and may be arranged to afford an additional protective covering for the latter. By employing a light-transmitting material which is thermoplastic, each of the light-transmitting wires may be connected at one end to its corresponding lamp bulb by simply heating the wire to a soft state and then pressing it against the bulb until it adheres to the bulb. Light from the bulb is then transmitted along the wire to the control panel where it provides a glow at the end of the wire, the operator thus being informed with certainty that the light is functioning. If desired, the end of the light-transmitting wire adjacent the lamp bulb may be held in position by a clamp, or the like, independent of the lamp bulb, or by cementing it to a support.

While the new lighting device is adapted for various uses, it will be specifically described for illustrative purposes in connection with a lighting system for vehicles. For a better understanding of the invention reference may be had to the accompanying drawing, in which:

Fig. 1 is a diagrammatic plan view of one form of a lighting system embodying the principles of our invention;

Fig. 2 is an enlarged view in vertical section through part of one of the headlights shown in Fig. 1;

Fig. 3 is an enlarged view, partly in section, showing part of a modified form of the new lighting device, and Fig. 4 is an enlarged view in vertical section through part of one of the tail lights shown in Fig. 1.

Referring to the drawing, the numerals 10 and 10' designate two headlights, respectively, of a vehicle, the headlights being of any suitable form. In the form illustrated, each headlight comprises a casing 11 and a lamp bulb 12 located in front of a parabolic reflector 13 in the casing, the reflector being spaced from the back of the casing to provide a chamber 14 therein The lamp 12 is removably mounted in a socket 15 extending through a central opening in the rear end of the reflector and suitably secured to the reflector.

Each of the sockets 15 is connected to a storage battery or other current source (not shown) by means of a wire cable 17 comprising a pair of conductors 18 and suitable insulation 19 covering the conductors. The conductors 18 are connected at one end to terminals (not shown) in the socket 15, and the cable 17 extends from the socket through the chamber 14 to a bushing 20 fixed in an opening in the casing 11. At its outer end, the bushing 20 receives one end of a sheathing cable 21 which is held in the bushing by means of a screw 22, the cable 21 extending from the headlight through the engine hood (not shown) toward a light switch 23 on a control panel 24, as is common in vehicles. The wire cable 17 extends through the sheathing cable 21 to a point near the control panel 24, where it is led out of the sheathing cable and connected to the light switch 23. From the light switch 23, electrical connection is made in the usual manner through a cable 25 to the storage battery (not shown) whereby a circuit through the battery and lamps is established when the switch is turned on.

In each of the headlights 10, 10' is a flexible, wire-like member 26 made of a plastic light-transmitting material, such as a methacrylic ester polymer or other light-transmitting organic plastic. The wire 26 may be made in various ways, but we have found that a convenient way of forming it is by extruding a mass of the material through an opening of appropriate size or by moulding the material. The light-transmitting material is preferably thermoplastic and has a high index of refraction, whereby it may be bent at sharp angles without materially affecting its light-transmitting property. One end of the wire 26 is positioned near the filament of the lamp 12 where it may receive light rays from the lamp, and it may be connected directly to the lamp by energizing the filament until the bulb is hot and then pressing the wire against the bulb to permit it to soften and adhere to the bulb, or it may be clamped in position, as will be described in greater detail presently. From the bulb, the wire 26 extends through a suitable opening in the reflector into the chamber 14, from where it is led through the bushing 20 and the sheathing cable 21.

At a point near the control panel 24, the light-transmitting wire is drawn out of the sheathing cable 21 and led away from the wire cable 17 to a transparent disk 27 disposed in an annulus 28 in the control panel. The annulus 28 is provided with an outwardly extending peripheral flange 29 which engages the face of the control panel, and the annulus extends through the control panel and has a nut 30 threaded on the inner end thereof to hold the annulus in position. The transparent disk 27 is held in the annulus between a rib 31, formed at the front of the annulus, and a contractible ring 32 located in back of the disk and backed by a rib 33. At its rear end, the light-transmitting wire 26 is enlarged to form a lens 34 engaging the inner face of the disk 27 and suitably secured thereto, preferably by heating the lens to a plastic state and pressing it against the disk. The integral lens 34 may be formed by moulding or upsetting the end of wire 26, or in any other suitable manner. The light-transmitting wire for the headlight 10' is similar in all respects to that for the headlight 10 and terminates in a lens behind a transparent disk 27' in the control panel adjacent the disk 27.

The vehicle may also be provided with a pair of tail lights 36 and 36', respectively, which may be of any suitable form but preferably include a casing 37 and a lamp bulb 38 removably mounted in a socket 39 in the casing. The socket is mounted on a support 40, and the bulb is adapted to be energized by current supplied to the socket through a wire cable 41 similar to cable 17. The cable 41 is led from the socket through a bushing 42 in the rear end of the casing and into a sheathing cable 43 clamped at one end in the bushing. The sheathing cable 43 and wire cable 41 extend from the bushing 42 to a point near the control panel 24, where the conductors in the wire cable are connected to the light switch in the usual manner.

A light-transmitting wire 44, similar to the wire 26, is held at one end by a spring clamp 44' (Fig. 4) adjacent to each of the lamp bulbs 38 and extends through an opening in the support 40 to the chamber in back of the support. From the tail lights 36 and 36', the light-transmitting wires 44 extend through the respective sheathing cables 43 to points near the control panel 24, where they leave their sheathings and are led away from the wire cables 41 to transparent disks 45 and 45', respectively, mounted in the control panel below the disks 27 and 27'. At their front ends, the light-transmitting wires 44 are provided with enlargements (not shown) similar to the enlargement 34, each of which is secured to the inner face of its respective transparent disk. Preferably, the disks 45, 45' are colored red or any other color contrasting with that of the disks 27 and 27', and the control panel is provided with suitable indicia 46 for distinguishing between the different head and tail lights corresponding to the transparent disks.

When the driver turns on the switch 23, the head and tail lights are normally energized by current supplied through the wire cables 17 and 41, and light emitted from the bulbs 12 and 38 is transmitted through the flexible wires 26 and 44, respectively, to the transparent disks on the control panel. The enlarged ends of the light-transmitting wires immediately behind the transparent disks form lenses which glow under the action of the transmitted light and thereby provide an indication to the operator that the corresponding lights of the vehicle are functioning. In the event that any one of the lamps 12 or 38 should fail to operate, the driver is warned of the defect by the absence of a glow behind one of the transparent disks on the control panel, and by reference to the color of the disk and the indicia 46 adjacent to it, the driver may readily determine which of the lamps is defective. By forming the light-transmitting wires of a material having a high index of refraction, they may be bent without substantially affecting the amount of light transmitted to the lenses behind the control panel. In addition, the light-transmitting wires are fully protected against damage by the sheathing cables 21 and 43 which house the wire cables.

It will be apparent that the indicating means of the new lighting system may be easily installed by passing the light-transmitting wires 26 and 44 through the sheathing cables along with the wire cables 26 and 41. The light-transmitting wires, when connected to the lamp bulbs by the inherent adhesiveness of the wires, do not require a separate connector for this purpose and may be readily disconnected from the bulb to permit replacement and then connected to the new bulb. When held by the spring clamps 44', the light-transmitting wires do not interfere in any way with the operation of replacing the bulbs. The thickness of the light-transmitting wires will depend on the light-transmitting qualities of the material used in the wires and the distance through which the light is to be transmitted from the lamps.

In some cases, it may be desirable to mould the light-transmitting material around the wire cables of the lighting system to provide greater protection to the electrical conductors. As shown in Fig. 3, a composite cable 48 is formed by moulding a mass of light-transmitting material 49 around a wire cable 50, which may be similar to the cable 17. The light-transmitting material 49 is similar to the material from which the wires 26 and 44 are made and is moulded around the wire cable 50 in any suitable manner so as to provide a substantial thickness of the material 49 sufficient to transmit light along the cable 48.

The composite cable 48 may be led through a sheathing cable (not shown) similar to the cables 21 and 43, or the sheathing cable may be omitted. When it is desired to employ a sheathing cable, the composite cable 48 is led out of it at a point near the control panel and is provided with a branch 51, made of a solid mass of the light transmitting material, which leads to the inner face of one of the transparent disks on the panel, where it is enlarged to form a lens 51'. The other branch 52 of the cable contains the wire cable 50 and leads to the switch 23 on the control panel. With this construction, the material 49 not only provides an insulating and protective sheathing for the wire cable, but also transmits light from the light source to the control panel so as to indicate to the driver whether the light source is functioning.

We claim:

1. In combination with a lighting system comprising an incandescent lamp, wiring leading to the lamp for conducting current thereto, and a sheathing through which the wiring extends and having one end located at a point remote from the lamp, a flexible, wire-like, light-transmitting member extending through the sheathing adjacent said wiring and having one end located near the lamp in position to receive light rays therefrom, the light-transmitting member extending through said end of the sheathing and terminating in a part which glows under the action of light transmitted through the member.

2. In combination with a lighting system comprising an incandescent lamp, wiring leading to the lamp for conducting current thereto, and a sheathing through which the wiring extends and having one end located at a point remote from the lamp, a flexible, wire-like, light-transmitting member extending through the sheathing adjacent the wiring therein and having one end located near the lamp in position to receive light rays therefrom, the end of the light-transmitting member remote from the lamp terminating in a part which glows under the action of light transmitted through the member, a switch connected to said wiring for operating the lamp, and means for mounting said remote end of the light transmitting member near the switch.

3. A lighting system for vehicles comprising head and tail lights, each including a casing and an incandescent lamp in the casing, a control panel remote from the lights, a switch adjacent the control panel for controlling the lights, wiring for conducting current to each of the lamps and extending to the switch, a sheathing cable extending between each of the lights and the control panel for housing said wiring, a flexible, wire-like member of light-transmitting material disposed in each of the cables and having one end located adjacent the respective lamp in position to receive light rays therefrom, the opposite end of the member being disposed behind the panel and visible therethrough and terminating in a part which glows under the action of light transmitted along the member, and indicia on the panel for designating the lights corresponding to the different light-transmitting members.

4. A lighting device comprising an incandescent lamp, and a flexible, wire-like member of thermo-plastic, light-transmitting material having one end fused to the bulb of the lamp and the opposite end located at a point remote from the lamp.

5. For use in combination with an illuminating device, a sheathing cable, wiring extending through the cable for conducting current to the illuminating device, and a flexible wire-like member of light transmitting material extending through the cable adjacent the wiring for transmitting light from said device to a distant point.

JOHN E. PAUL.
CLARENCE B. LEE.